United States Patent [19]

Mesnel et al.

[11] Patent Number: 4,744,174
[45] Date of Patent: May 17, 1988

[54] MOVABLE FLUSH WINDOW SYSTEM ESPECIALLY FOR A MOTOR VEHICLE DOOR

[75] Inventors: Gerard Mesnel, Carriers-sur-Siene; Francois Mesnel, Neuilly-sur-Seine, both of France

[73] Assignee: Mesnel S. A., Carriers-sur-Seine, France

[21] Appl. No.: 49,102

[22] Filed: May 13, 1987

[30] Foreign Application Priority Data

Oct. 3, 1986 [FR] France .............................. 86 13815

[51] Int. Cl.⁴ .......................... B60J 5/04; E05F 11/38
[52] U.S. Cl. ...................................... 49/374; 49/377; 49/502; 49/506
[58] Field of Search .................. 49/374, 375, 376, 377, 49/378, 502, 506; 296/146

[56] References Cited

U.S. PATENT DOCUMENTS 4,649,668  3/1987  Skillen et al. .......................... 49/374

FOREIGN PATENT DOCUMENTS 2521497  10/1984  France .
2543207   6/1985  France .
2543074   5/1987  France .
2564047   7/1987  France .

Primary Examiner—Philip C. Kannan
Attorney, Agent, or Firm—Foley & Lardner, Schwartz, Jeffery, Schwabb, Mack, Blumenthal & Evans

[57] ABSTRACT

A movable flush window system, especially for a motor vehicle door, comprises two pressed metal panels welded together so as to form a rebate at the periphery of the location for the window on the sides other than that on which the window can be retracted between the panels. The window system further comprises two parallel panes joined together near their periphery by means of a continous spacer fixed to the two opposing faces and defining, with the contiguous outer portions of the panes, a U-shaped profile intended for capping the rebate in order to ensure the guidance and sealed closure of the window.

12 Claims, 2 Drawing Sheets

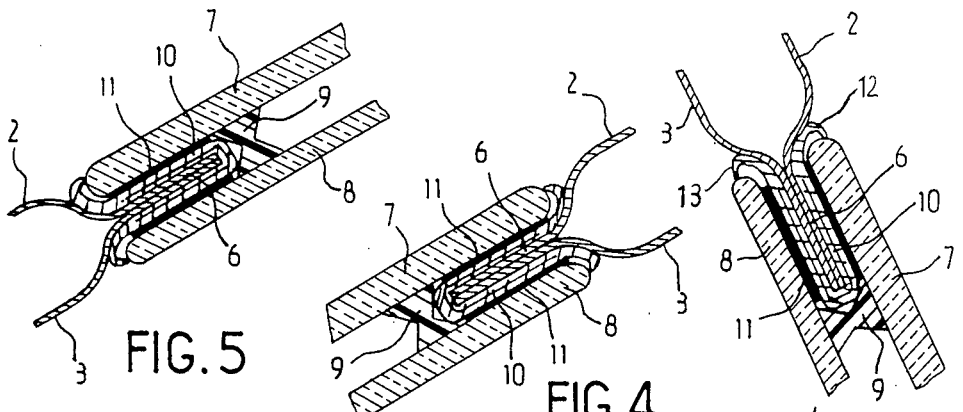
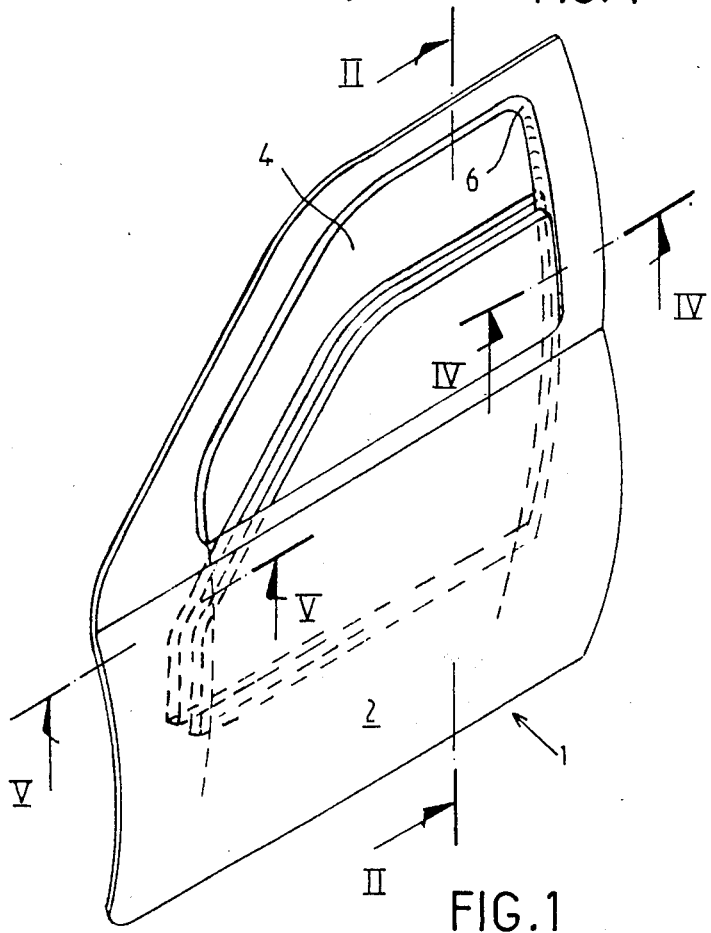

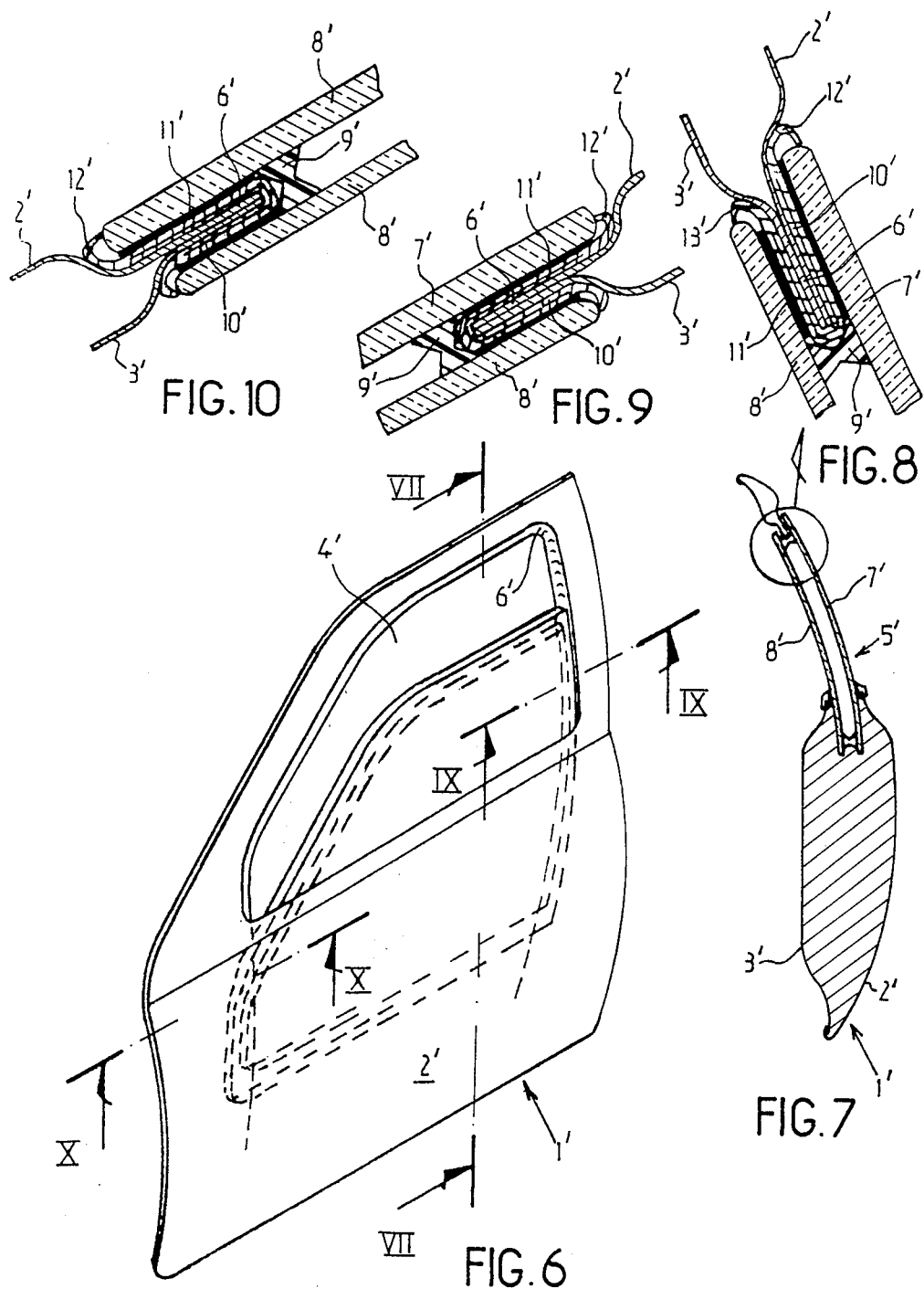

MOVABLE FLUSH WINDOW SYSTEM ESPECIALLY FOR A MOTOR VEHICLE DOOR

BACKGROUND OF THE INVENTION

The present invention relates to a new movable flush window system especially for a motor vehicle door.

As is known, it has become customary to make motor vehicle doors from two pressed panels, one on the outside and the other on the inside, joined together by welding particularly at the periphery of the windows. This design has caused a radical development in the means for the guidance, sliding and soundproofing of the movable windows. These developments are illustrated in the following: French Pat. No. 2,521,497 and certificates of addition Nos. 2,543,207 and 2,564,047.

The development of bodies on which the air streams flow along the outer surfaces, causing as little air turbulence as possible, in order to increase the coefficient of penetration Cx of the vehicles in the atmosphere, has also prompted the manufacturers to review the window systems of motor vehicle doors. This review has provided movable windows which are flush with the outer face of the door and which are therefore called "flush" windows, also known as "Flush-Glass" as illustrated by French Pat. No. 2,543,074.

SUMMARY OF THE INVENTION

It is therefore an object of the present invention to provide a new guide, sliding and sealing system which is intended for flush windows and which is conducive to ensuring that the window is flush, as desired, and at the same time only requiring minor modifications to the body.

It is also an object of the present invention to provide such a window system for motor vehicle doors which considerably reduces, within the vehicle, the outside road and air noises when the vehicle is traveling at high speed and at the same time improving the thermal insulation of the vehicle.

It is a further object of the present invention to provide a window system that can improve the coefficient of air penetration of the vehicle.

Another object of the present invention is to provide a window having a pane that can overlap the door panel.

In accordance with one aspect of the present invention these objects are achieved by a movable flush window system, especially for a motor vehicle door, comprising:

(a) two panels connected together forming a door having a window aperture;

(b) a movable window comprising two substantially parallel panes, the window being retractable between the two panels;

(c) means, disposed on the sides of the panels adjacent the aperture other than the side on which the window can be retracted between the panels, for engaging the window at the periphery thereof;

(d) means, joined to the two panes at the periphery thereof, for spacing apart the two panes, the spacing means defining with the contiguous outer portions of the two panes a substantially U-shaped profile for receiving the engaging means so as to guide and seal the closure of the window in the aperture.

In accordance with another aspect of the present invention these objects are achieved by a flush window system wherein the two panes comprise substantially dissimilar profiles, and wherein an outer pane projects laterally relative to an inner pane so as be in the extension of the body or partially overlap one of the panels.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An illustrative embodiment of the invention is described in further detail below, with reference to the accompanying drawings, in which:

FIG. 1 is a perspective view of a motor vehicle door seen from outside, with an embodiment of a window according to the invention lowered to mid-height;

FIG. 2 is a section along the line II—II of FIG. 1, with the window in the closed position;

FIG. 3 is an enlarged detailed view of the part surrounded by a circle in FIG. 2;

FIG. 4 is a partial section along the line IV-IV of FIG. 1;

FIG. 5 is a partial section along the line V—V of FIG. 1;

FIG. 6 is a perspective view of a motor vehicle door seen from outside, with a second embodiment of a window according to the invention lowered to mid-height;

FIG. 7 a section along the line VII—VII of FIG. 6, with the window in the closed position;

FIG. 8 an enlarged detailed view of the part surrounded by a circle in FIG. 7;

FIG. 9 is a partial section along the line IX—IX of FIG. 6;

FIG. 10 is a partial section along the line X—X of FIG. 1.

DETAILED DESCRIPTION OF PREFERRED EMBODIMENTS

The present invention is a movable flush window system, especially for a motor vehicle door comprising two pressed metal panels welded together so as to form a rebate at the periphery of the location for the window on the sides other than that on which the window can be retracted between the panels. The window system comprises two parallel panes joined together near their periphery by means of a continuous spacer fixed to the two opposing faces and defining, with the contiguous outer portions of the panes, a U-shaped profile intended for capping the rebate in order to ensure the guidance and sealed closure of the window.

According to the present invention, the term "pane" embraces not only glass panels, but also any transparent, translucid or opaque plastic panel.

To make it easier for the window to slide, the rebate can be covered by a section coated with a material having a high sliding coefficient.

An important feature of the present invention is therefore that the window slides on the rebate which is integrally formed with the door. In contrast, in conventional systems the window slides in a guide element and fits completely into the element in the closed position. In the present invention, the guide element is formed by the rebate which is engaged into the space separating the window-pane assembly.

Moreover, because two parallel panes are used, it is possible to arrange the outer pane substantially in the plane of the outer panel of the door, even with partial overlapping of the latter, thus considerably improving the aerodynamic characteristics of the vehicle.

The section with which the rebate is equipped has, for example, a reinforcement which is made of aluminum, but which could, if appropriate, also be made of any other metal or alloy. The material having a high sliding coefficient, with which this reinforcement is coated, can be composed of any product used for this purpose in the art such as a fabric, products based on "Teflon" (a registered trademark), or the like.

Preferably, the section with which the rebate is equipped also includes window and body-sealing members such as lips made of flexible and deformable rubber.

Additionally, as with double glazing used in buildings, the thermal insulation and soundproofing obtained by means of the window according to the present invention is considerably improved.

Preferably, to prevent any sound resonance, the two panes forming the window have different thicknesses, the thicker pane being on the outside.

The spacer material joining the two panes together connects the two opposing surfaces chemically and physically. The spacer can be an elastomeric, plastomeric or vitreous ceramic type material, but is preferably flexible, to allow it to compensate for surface defects of the panes or body. This spacer will advantageously have a transverse cross-section in the form of a double trapezium joined by the short sides. This allows a certain amount of flexibility of the assembly in order to make it possible for the panes to move relative to one another.

The two panes can have substantially identical profiles, with their corresponding edges disposed in a plane perpendicular to the panes. The two panes can also be offset parallel to one another. The outer pane can project laterally relative to the inner pane in order to align this outer pane perfectly with the body or even make the outer pane overlap the outer panel of the door.

When the windows are closed, the motor vehicle will thus be a closed box in which the changes in plane attributable to the windows are reduced to the strict minimum, thus making it possible to improve the coefficient of air penetration of the vehicle.

The motor vehicle door 1, illustrated in FIGS. 1 to 5, comprises two pressed panels, one on the outside 2 and the other on the inside 3, which are joined together by welding.

The aperture 4, which is closed off by a movable window designated by the general reference numeral 5, is obtained when the panels 2 and 3 are cut out, pressed on the periphery of the cut-out and joined together by means of spot-welding in the upper part and along the side edges of the aperture to form a rebate 6. The rebate 6 is defined along one side of a protruding flange formed by the joining of the panels 2 and 3.

According to the present invention, the door rebate 6 with the adjacent flange forms the guide member of the window 5. The window 5 comprises two parallel panes 7 and 8 joined together at a short distance from their periphery by means of a spacer 9 fixed to the two opposing faces. The window 5 defines, with the contiguous outer parts of the panes 7 and 8, a recess of U-shaped cross-section intended for capping the rebate 6 and adjacent flange in order to slide thereon, as shown in FIG. 1, and for sealing off the aperture 4. The recess caps the whole of the rebate 6 over its entire length, as can be seen in FIGS. 3, 4 and 5.

To ensure that the window slides easily, the rebate 6 is covered by a section 10 which has an aluminum reinforcement faced with a rubber or plastic polymer and which is coated with a material 11 having a high sliding coefficient such as a fabric or the like. The reinforcement section 10 also includes flexible rubber lips 12 and 13 which are curved towards the panes and form the sealing system for the panes.

It will be noted that the panes 7 and 8 have different thicknesses, the outer pane 7 being thicker, to prevent sound resonance.

To provide a certain amount of flexibility in the assembly of the two panes 7 and 8, the spacer 9 has a cross-section in the form of a double trapezium joined by the short sides.

In the embodiment shown in FIGS. 1 to 5, the panes 7 and 8 have an identical profile, with their corresponding edges located in the same plane which is perpendicular to the rebate 6.

Due to the double glazing, the soundproofing obtained will greatly exceed that of conventional windows, and the road and air noises will be greatly reduced, even at high speed. Moreover, it is possible to offset the pane 7 outwards, so that it is substantially in the extension of the outer panel 2, in order to prevent the breakdown of airstreams in the region of the window and thus improve the coefficient of air penetration of the vehicle.

Referring to FIGS. 6 to 10 an alternate embodiment of the present invention is illustrated, wherein the members described with reference to FIGS. 1 to 5 are designated by the same reference numerals assigned the index.

In this alternate embodiment, the two panes 7' and 8' are still parallel to one another, but the outer pane 7' projects relative to the inner pane 8' both upwards and sideways. It is thus possible to align the outer pane 7' perfectly with the body or even overlap the latter to improve the air penetration of the vehicle even further, and at the same time preserving the advantages of soundproofing, thermal insulation and sealing of the embodiment described previously.

These two alternate embodiments illustrate the great advantage of using as a window pane guide member the rebate 6 or 6' which is formed integrally with the door, without the need for any complicated auxiliary member, like those of the prior art.

What is claimed is:

1. A movable flush window system, comprising:
 (a) two panels connected together forming a door having a window aperture with a window receiving side and plurality of window contacting sides;
 (b) a movable window comprising two substantially parallel panes, said window being retractable through said window receiving side of said aperture to a position between said two panels;
 (c) means for engaging said window at the periphery thereof, said engaging means being disposed along the window contacting sides of said aperture;
 (d) means for spacing apart said two panes, said spacing means receiving said engaging means so as to guide and seal said window in said aperture.

2. A flush window system as claimed in claim 1, wherein said engaging means comprises a flange formed at mating surfaces of said two panels.

3. A flush window system as claimed in claim 1, wherein said spacing means comprises a continuous spacer joined to opposing faces of said two panes.

4. A flush window system as claimed in claim 1, wherein said spacing means comprises a flexible material.

5. A flush window system as claimed in claim 1, wherein the said engaging means is covered by a reinforcement section coated with a material having a high sliding coefficient.

6. A flush window system as claimed in claim 5, wherein said reinforcement section comprises a lip member for sealing said window system.

7. A flush window system as claimed in claim 1, wherein said two panes each have different thicknesses.

8. A flush window system as claimed in claim 7, wherein an outer pane of said window is thicker than an inner pane.

9. A flush window system as claimed in claim 1, wherein said the, spacing means has a transverse cross section in-the form of a double trapezium joined by the short sides.

10. A flush window system as claimed in claim 1, wherein said two panes comprise substantially identical profiles, each of said panes having a corresponding edge disposed in a plane perpendicular to said panels.

11. A flush window system as claimed in claim 1, wherein said two panes comprise inner and outer panes with substantially dissimilar profiles, wherein the outer pane projects laterally relative to the inner pane so as be substantially flush with an outer surface of one of said panels.

12. A method of providing a sealed movable window, comprising:
   providing a structure having a window opening with one open side for retracting the window and at least one window contacting side, said window contacting side having a protruding region;
   providing a window having a periphery with a recess to receive said protruding region;
   mounting said window in said opening with said protruding region received in said recess such that said window can be retracted through said open side of said window with said window being guided by said protruding region in said recess.

* * * * *